United States Patent
Hariharan et al.

(10) Patent No.: US 9,965,379 B1
(45) Date of Patent: May 8, 2018

(54) CROSS-PLATFORM API TEST FLOW SYNTHESIZER

(71) Applicant: SAP SE, Walldorf (DE)

(72) Inventors: Sathish Hariharan, Bengaluru (IN); Harish R, Bengaluru (IN); Vinoth Kumar Thirusangu, Bengaluru (IN); Mithun Sandeep Korlepara, Bengaluru (IN); Rahul Kumar, Bengaluru (IN)

(73) Assignee: SAP SE, Walldorf (DE)

( * ) Notice: Subject to any disclaimer, the term of this patent is extended or adjusted under 35 U.S.C. 154(b) by 33 days.

(21) Appl. No.: 15/348,624

(22) Filed: Nov. 10, 2016

(51) Int. Cl.
*G06F 9/44* (2018.01)
*G06F 11/36* (2006.01)

(52) U.S. Cl.
CPC ...... *G06F 11/3684* (2013.01); *G06F 11/3688* (2013.01); *G06F 11/3692* (2013.01)

(58) Field of Classification Search
CPC .................. G06F 11/3664; G06F 11/3688
USPC ......................... 717/124, 127, 104
See application file for complete search history.

(56) References Cited

U.S. PATENT DOCUMENTS

| | | | | |
|---|---|---|---|---|
| 5,652,835 A * | 7/1997 | Miller | ................. | G06F 11/3684 706/55 |
| 8,826,084 B1 * | 9/2014 | Gauf | ................... | G06F 11/3688 714/32 |
| 9,864,674 B2 * | 1/2018 | Singi | .................... | G06F 11/3664 |
| 2003/0208351 A1 * | 11/2003 | Hartman | ............. | G06F 11/3684 703/22 |
| 2005/0132332 A1 * | 6/2005 | Sathe | ........................ | G06F 8/34 717/124 |
| 2006/0101397 A1 * | 5/2006 | Mercer | ............... | G06F 11/3684 717/120 |
| 2011/0078790 A1 * | 3/2011 | Fazunenko | ............. | G06F 9/468 726/22 |

* cited by examiner

*Primary Examiner* — Phillip H Nguyen
(74) *Attorney, Agent, or Firm* — Buckley, Maschoff & Talwalkar LLC (57) ABSTRACT

A system, method, and computer-readable medium, including obtaining a plurality of different application program interfaces (APIs), one for each of a plurality of different technology stacks, to be used in a test flow of a product constructed of the plurality of different technology stacks; generating a model of a test flow using each of the plurality of different APIs; defining input and output parameters for each of the plurality of different APIs in the model; automatically generating executable instructions to execute the modeled test flow; and storing a record of the executable instructions to execute the modeled test flow.

16 Claims, 5 Drawing Sheets

CROSS-PLATFORM API TEST FLOW SYNTHESIZER

BACKGROUND

Testing of software products such as applications can be a time consuming process. The process may be made more complex when a software product comprises multiple different technologies to execute the software. In some instances, multiple technology stacks may be used to execute one software product. As such, a testing effort will need to communicate and operate with each of the different technologies. Creating an integrated test flow that accounts for each of the different technologies in a single test flow is a difficult task given the specifics of each technology stack.

However, some users may have a desire to efficiently create an integrated test flow that operates across multiple technologies.

DETAILED DESCRIPTION

The following description is provided to enable any person in the art to make and use the described embodiments. Various modifications, however, will remain readily apparent to those in the art.

In some example contexts, use-cases, and embodiments, one or more terms will be used in the present disclosure. As a matter of introduction and to ease the understanding of the present disclosure, a number of terms will be introduced, where the full meaning of the following terms will be further understood in context of the disclosure herein, on the whole.

Figure 1:
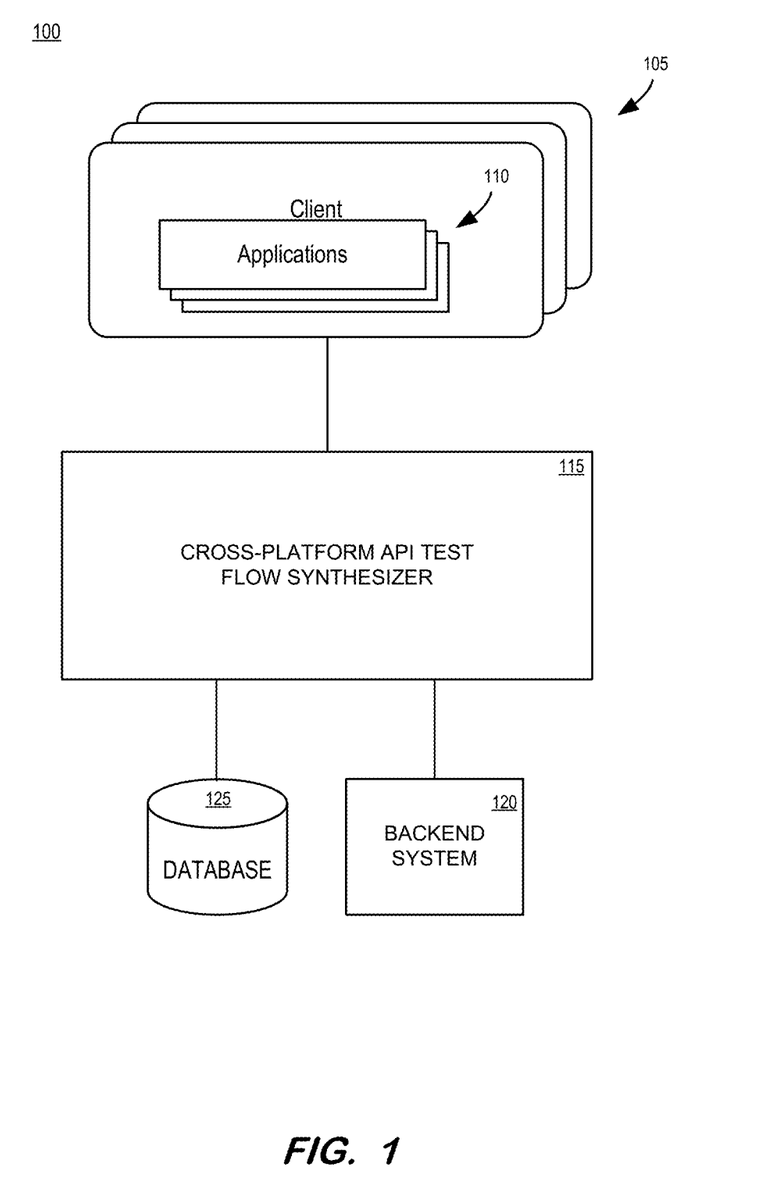
FIG. 1 is an illustrative schematic diagram of a system.

FIG. 1 is an illustrative block diagram of an architecture or system 100, in one example. Examples of some embodiments of the present disclosure are not limited to the particular architecture 100 shown in FIG. 1. System 100 includes one or more client devices 105 running one or more applications 110. Applications 110 may, in some embodiments, include a suite of different software applications having, at least to some extent, related functionality, similar user interfaces, and some ability to exchange data with each other. Applications 110 may include different software applications that support the operations and process of an organization. In some embodiments, one of the applications 110 may include functionality or a tool to test software comprising multiple technologies. In some aspects, a software product to be tested is constructed of a heterogeneous combination of technologies. The functionality or tool that may be implemented by one of applications 110 supports multiple technology stacks based on application program interfaces (APIs) in the product or a portfolio of products interacting with each other. In some aspects, the tool disclosed herein may provide a mechanism to test the product or portfolio of products comprising multiple, different technology stacks.

In some instances, the different technology stacks may include Java, Python, Shell, one or more SDK (software development kit) development environments, and other technologies. In some aspects, an API may be newly generated to accommodate the testing of a product employing a particular technology stack, if an appropriate API is not known or available to the tools, systems, and processes disclosed herein.

System 100 includes a cross-platform API test flow synthesizer service or server 115. In some embodiments, a functionality or service for testing a product or portfolio of products comprising multiple technologies based on the APIs of the product(s) may be deployed as a cloud-based service, whereas in some other embodiments system 100 may include a client-server architecture. System 100 may encompass both scenarios. In the instance system 100 includes a server at 115, the devices at 105 may be client devices running applications as discussed above. In an instance system includes a cloud-based server at 115, the devices at 105 may execute a browser that is used by a user to interface with service 115.

System 100 further includes a backend system that can execute, and in some instances generate, automatically, executable code or instructions to perform, a test flow specified by a user. In some aspects herein, a user may provide an indication of the different APIs to be tested in a test flow and the functionality of the tool, as implemented in an application 110 and/or server or service 115, may operate in cooperation with the processing of a backend system 120 to generate a program to effectuate the test flow across the different, multiple APIs of the product under test.

In one example, a client 105 executes an application 110 to present a test flow tool via a user interface (UI) to a user on a display of client 105. The user manipulates UI elements within the UI to indicate a test flow including a number of APIs to be included, in order to test certain components/features of product(s) to be tested, where a server or service 115 embodying the cross-platform API test flow synthesizer operates, in cooperation with backend system 120 and database 125 to generate an executable program that can be executed to perform the test flow designed by a user of the system. The test flow results may be presented to the user in a view including, for example, a report, a dashboard, or other record(s).

Database 125 may comprise any data source or sources that are or become known. Database 125 may comprise a relational database, a HTML document, an eXtendable Markup Language (XML) document, or any other data storage system storing structured and/or unstructured data files. The data of database 125 may be distributed among several data sources. Embodiments are not limited to any number or types of data sources.

Database 125 may implement an "in-memory" database, where a full database is stored in volatile (e.g., non-disk-based) memory (e.g., Random Access Memory). The full database may be persisted in and/or backed up to fixed disks (not shown). Embodiments herein are not limited to an in-memory implementation. For example, data may be stored in Random Access Memory (e.g., cache memory for storing recently-used data) and other forms of solid state memory and/or one or more fixed disks (e.g., persistent memory for storing their respective portions of the full database).

Figure 2:
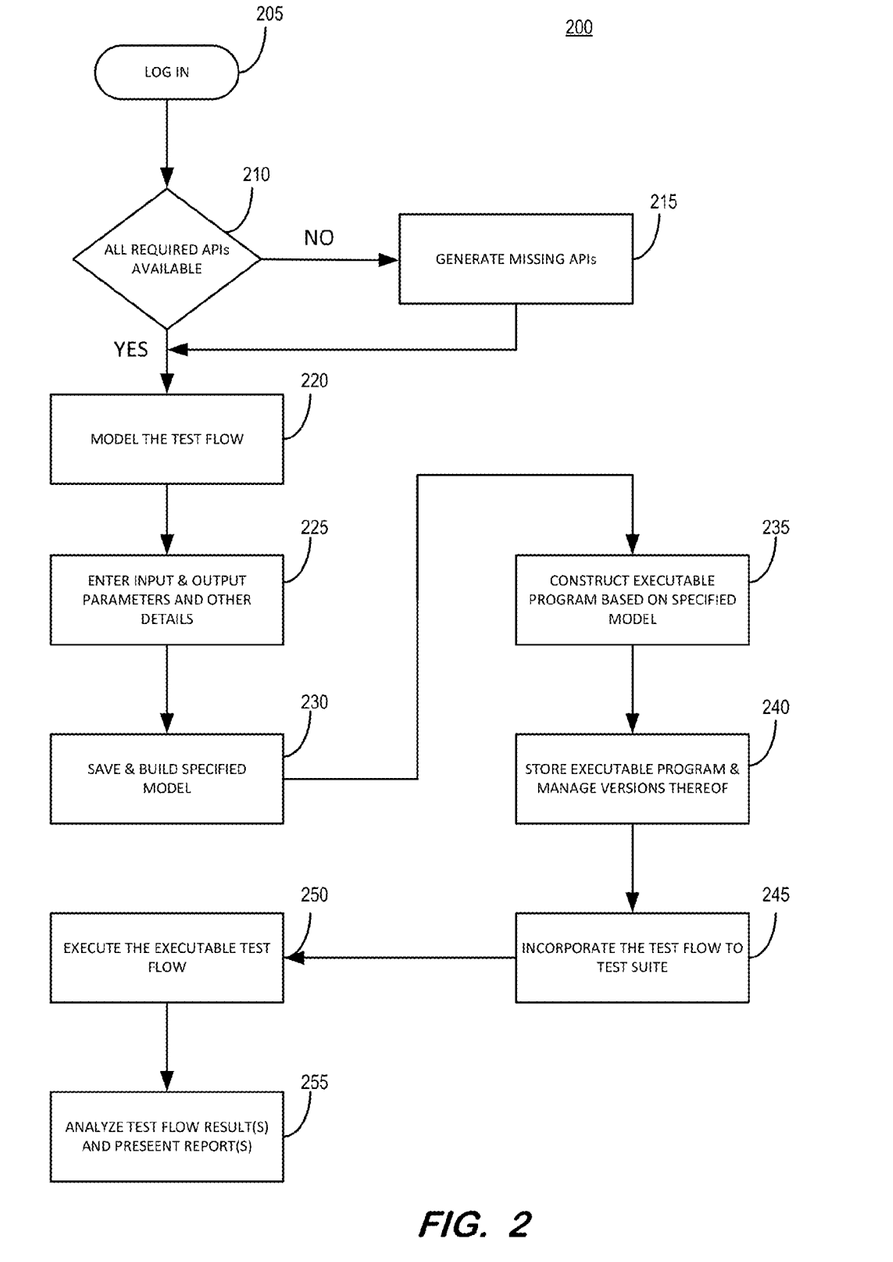
FIG. 2 is an example flow diagram.

FIG. 2 is an illustrative depiction of an example process 200. Process 200 may be implemented using a system including some, all, or none of the aspects shown in FIG. 1. At an initial operation 205, a user may log in to a system or tool herein. The user's login may entail certain security clearances that permit the user to interact with the system or tool as further outlined with regards to process 200. In some embodiments, a user's "role" within an organization and/or with the system or tool may dictate whether the user is authorized to use the tool or system as disclosed in FIG. 2.

At operation 210, a determination is made whether all of the APIs needed to run a desired test flow are available for the system. That is, if a software product comprises three different technology stacks as indicated by three different APIs in the product, then the system checks to see if it has access to the three APIs to effectively communicate with the product. If the system has access to the needed three APIs, which can be stored locally, remotely, or obtained from a third party, then process 200 proceeds to operation 220. If the system does not have access to all of the requisite APIs, then process 200 can proceed to operation 215. At operation 215, the missing one or more APIs can be generated by any number of techniques, including a manual or automated process for generating an appropriate API. From 215, process 200 advances to operation 220.

At operation 220, a model of the test flow to test the accuracy, effectiveness, compatibility, and other aspects of different components and features (e.g., units) of the product is configured. In some aspects, a user may provide an indication of the different APIs to be included in the test flow via a graphical UI. In some instances, a user may manipulate UI representations of the different APIs presented in the UI by, for example, a "drag and drop" and/or other UI techniques and interactions. After configuring a model of the test flow, a user may enter or otherwise specify input and output parameters, as well some other details of the API's comprising the test flow. The details specified at operation 225 may constitute the required values, inputs, and outputs to satisfy the test flow being constructed. The modeled test flow, updated to include the specifications of operation 225, is saved at operation 230.

Operations 235, 240, and 250 may be accomplished by a server or service, including a backend system. That is, these operations may be accomplished without intervention from a user. In some aspects, these operations may be performed by a system, device, or service automatically in response to receiving and processing of the modeled test flow defined/specified at operation 225. In particular, operation 235 includes constructing an executable program based on the specified model. The constructing of the executable model may include, for example, a model compiler understanding the APIs specified in the model and the other details therein as well (e.g., input parameters, output parameters, system parameters, etc.). Operation 235 may create a program in a language of the backend system (e.g., Python) that is different than any of the APIs comprising the test flow APIs. The particular language of the executable program generated at operation 235 may be based on one or more technical, processing, or data management considerations.

At operation 240, a run-level program may be stored in a data facility such as, for example, a "blob store". Additionally, version management of the stored executable program may also be supported at operation 240. Continuing, process 200 advances to operation 245 where the test flow now generated may be incorporated into a test suite or other test functionality.

Operation 250 may be invoked, initiated, or otherwise responsive to actions of a user. At operation 250 a user may request or invoke the execution of the executable program to effectuate the test flow. The execution of the test flow at operation 250 may be accomplished by a single performance of the executable program. That is, all of the APIs of the software product may called upon and communicated with by virtue of the single execution of the test flow. In this manner, all of the desired components, features, and units of the product may be tested by the one integrated test flow.

At operation 255, an analysis of the results of the test flow execution can be performed. Any one or more analytical processes and techniques can be used to analyze and report the findings of the analysis at 255.

Figure 3:
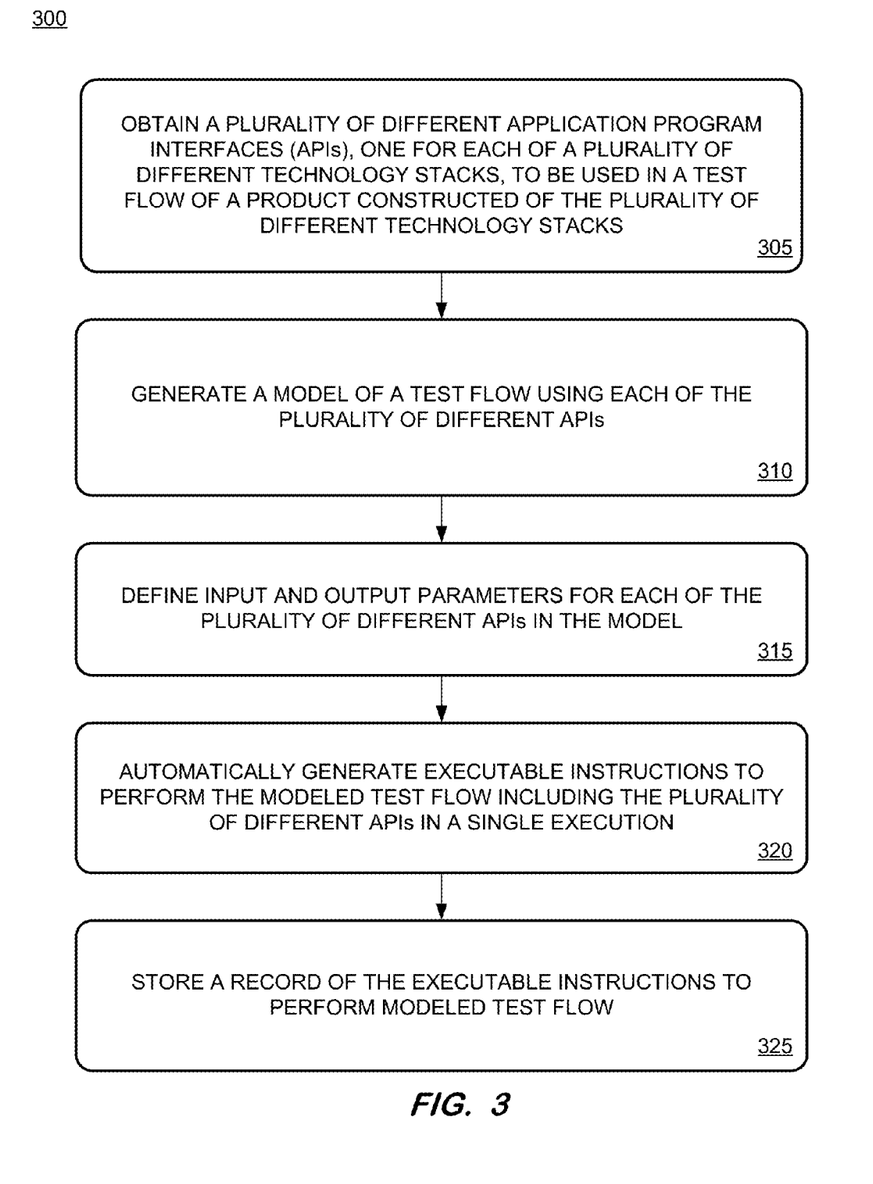
FIG. 3 is an example flow diagram of a process herein.

FIG. 3 relates to an example embodiment process 300. In some aspects, some of the operations of process may be similar to some of the operations of process 200. In one embodiment, process 300 relates to a process that may be performed by a system or a service. Operation 305 includes obtaining a plurality of different APIs, where each API corresponds to a different technology stack used in the execution of a product to be tested via a test flow being developed herein. Each of the APIs can be specified by a user. In some instances, the APIs may be determined by a tool or system, at least semi-automatically. That is, for example, a system or tool herein may examine, determine, or otherwise be aware of the APIs comprising the product to be tested.

At operation 310, a model of a test flow is generated. The generated test flow includes and facilitates testing each of the APIs of the product to be tested, to the extent that a feature, function, or unit of the product to be test corresponds to one of the APIs. The specific parameters and details of the model can be specified at operation 315 to accommodate the specific extent of testing desired and/or particular aspects of the product itself. For example, input and output parameters of the APIs included in the test flow may be specified or defined at operation 315.

Continuing to operation 320, executable instructions to perform the specified test flow model are generated at operation 320. Similar to other processes and operations discussed earlier, this portion of operation 300 may be generated automatically by a system (e.g., a backend system supporting a service). In some embodiments, the automatically generating of the executable instructions to perform the modeled test flow may include compiling, based on the defined input and output parameters for each of the different APIs, the test flow model including each of the plurality of different APIs in the test flow. In accordance with some aspects herein, a single execution of the executable instructions should test all of the technologies corresponding to the APIs in the test flow. A record of the executable instructions (i.e., program) generated at operation 320 may be stored at 325. In some embodiments, the stored executable test flow may be used and reused at the discretion of a user entity.

Figure 4:
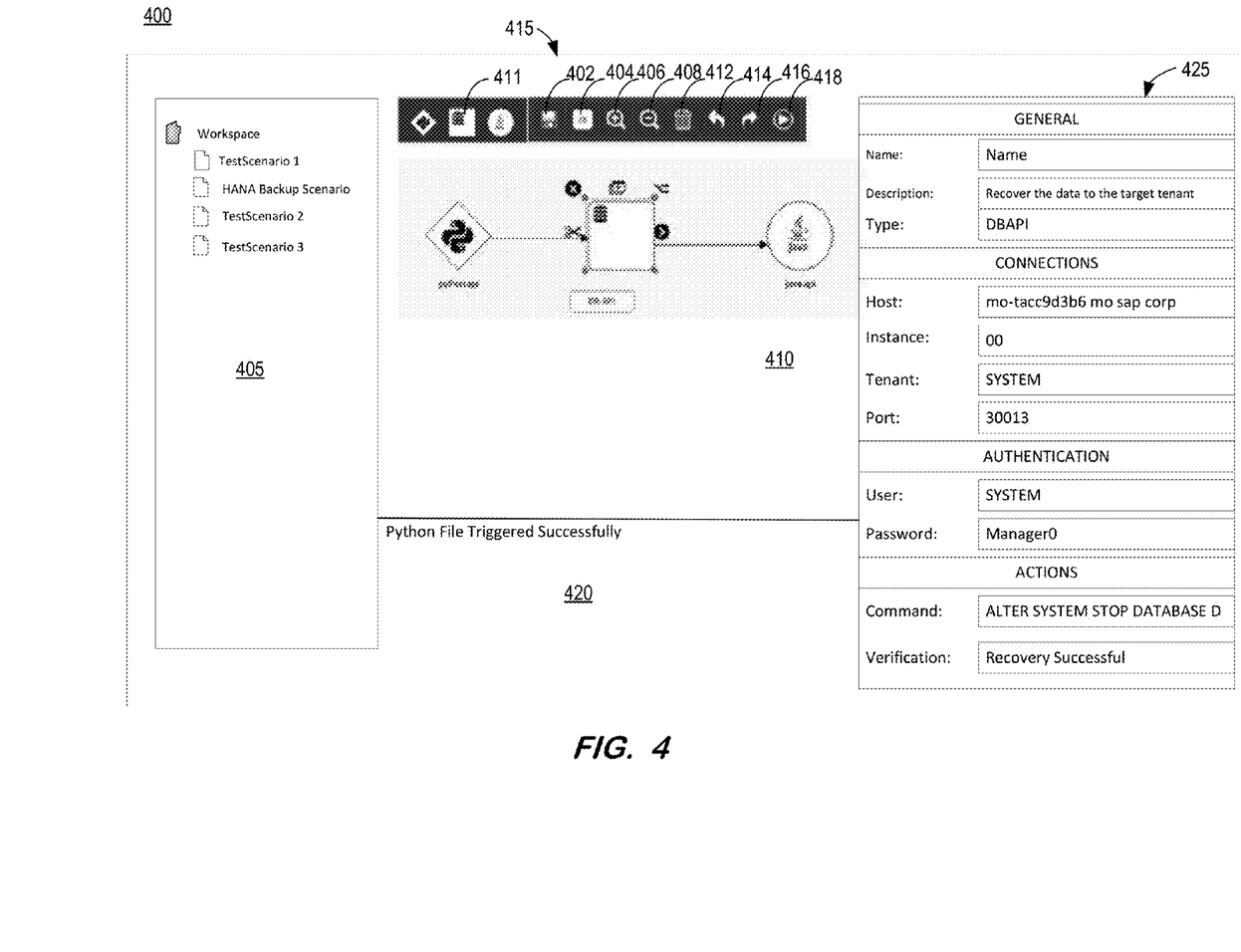
FIG. 4 is an outward view of an example embodiment of a user interface of an embodiment herein.

FIG. 4 is an illustrative depiction of an outward facing perspective of a UI 400, in accordance with some embodiments herein. For example, UI 400 may be generated by an application or it may be generated by a browser where a cloud service provides the functionality of a cross-platform API test flow synthesizer. UI 400 may be presented after a user has logged into a system or service. The login process may include one or more security features, including those now known and those that become known in the future. Regarding some of the API test flow aspects disclosed herein, an end-user or other entity creating an end-to-end test scenario in accordance with some aspects of the present disclosure can create a new project via a project explorer 405 portion of UI 400. An end-user may create any number of test scenario flows using the project explorer. In some instances, a previously created test scenario may be re-opened via project explorer 405. In some embodiments, representations of created test scenarios (e.g., graphical icons, other UI elements) may be listed in a tree-like structure where one or more test scenarios might be grouped into one or more file structures. As shown in FIG. 4, a listing of four created (i.e., existing) test scenarios are depicted as being in a "workspace" folder in project explorer 405.

UI 400 may also include a scenario editor 410, where representations 411 of multiple different APIs can be manipulated (e.g., dragged and dropped, etc.) into the editor. The representations of the different API's, shown at 411, can be arranged or configured in, for example, different sequences to reflect particular but different test flows or scenarios. APIs may be represented by distinctive identifying icons having specific colorations and/or shapes. As shown in FIG. 4, a plurality of different APIs is depicted to convey the flexibility of the systems and methods herein. The APIs in the present example are presented as graphical icons, however other presentations and configurations of the available APIs are within the scope of the present disclosure (e.g., a textual listing, etc.).

In some embodiments, a listing of different types of connectors (not explicitly shown in FIG. 4) that may be employed to configure, interconnect, or otherwise specify a test flow model including multiple, different APIs may be presented in scenario editor pane 410. The connectors may be used to interconnect two different technologies (e.g., Java to Python, Db to Java, etc.). In some embodiments, a user may drag and drop (although other techniques might be used) one or more APIs represented at 411 into the scenario editor 410 to include those specific APIs in a test flow that all of the APIs from a Source to a Target (i.e., end-to-end). Thus, the APIs in the test flow may be represented by the icon representations thereof in the scenario editor 410. Additionally, connectors may be used to associate the APIs in specific orders and groupings, per a desired test flow sequence.

In some embodiments, as depicted in FIG. 4, one or more UI control features may be associated with scenario editor 410. For example, Save button 402 can be selected to save a scenario configured in scenario editor 410; JS button 404 may be invoked to visualize a JSON response for the test flow; Magnifier buttons 406 and 408 may be selectively invoked to increase and decrease the level of magnification of a test scenario in the scenario editor, respectively; Delete button 412 may be used to delete a particular node (i.e., API) in a scenario in scenario editor 410; Undo and Redo buttons 414 and 416, respectively, may be selected to undo an action and to redo an action in a scenario in scenario editor 410; and Run/Play button 418 may be selected to run a scenario in scenario editor 410.

UI 400, in some embodiments as depicted in FIG. 4, may include a properties editor as shown at in display pane 420. In some embodiments, when an end-user clicks or otherwise selects one of the APIs in the scenario editor, respective properties for the selected node can be edited via the propertied editor in the different sections therein. The different categories and properties may include, for example, General properties that include Name, Type of API and Description parameters; a Connections category that includes parameters for the specific connection details to a DB/Gateway system, etc. based on the API's. (e.g., host, port, etc.); an Authentication category that might include parameters and propertied related to, for example, user and password credentials to connect to an associated DB; and an Actions category that may include different properties relating to the particular kind of actions that need to be performed in the node. Some example actions include, for example, create a table, perform a backup and recovery, and etc. In some instances, an end user might be able to enter SQL commands (or other instructions) in the COMMAND field and, if need be or desired, enter any Verifications in the Actions category of properties. In some embodiments, some aspects of properties editor 420 might change where the properties are dependent on the APIs used in a test flow scenario.

In some embodiments, once the test flow is created (e.g., test scenario created/opened in project explorer 405, test flow configuration specified in scenario editor 410, and properties of the components and nodes of the test flow scenario are defined via the properties editor 420), the end-user can click on Save button 402 to save the created test flow scenario. The user may then click or otherwise select/invoke Run button 418 to start an execution of the test flow scenario. In response to the running or execution of the test flow scenario, an output of the executing scenario can be displayed in console pane 425. In some embodiments, a sequence of steps of the executing test flow scenario may be displayed in the console pane 425, with each displayed step having an accompanying indication of whether the given step passed or failed.

UI 400 is an illustrative depiction of one UI for facilitating and supporting a user's interaction with a tool and system herein. Other configurations and features of a UI are encompassed by the present disclosure, in accordance with the remaining disclosure herein.

Figure 5:
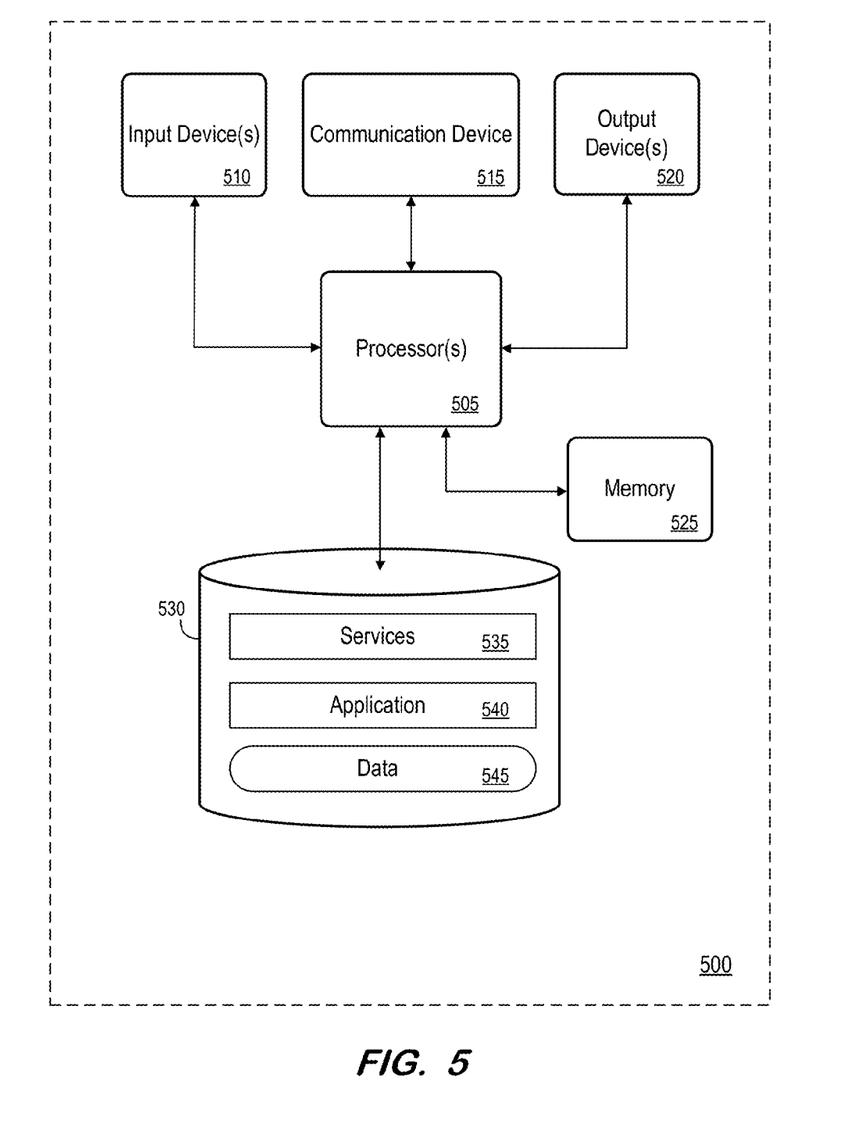
FIG. 5 is a block diagram of an apparatus, according to some embodiments.

FIG. 5 is a block diagram of apparatus 500 according to some embodiments. Apparatus 500 may comprise a computing apparatus and may execute program code to perform any of the functions described herein. Apparatus 500 may comprise an implementation of server supporting an application (e.g., 110), a service 115, and a backend 120 of FIG. 1 in some embodiments. Apparatus 500 may include other unshown elements according to some embodiments.

Apparatus 500 includes processor 505 operatively coupled to communication device 515, data storage device 530, one or more input devices 510, one or more output devices 520, and memory 525. Communication device 515 may facilitate communication with external devices, such as a reporting client, or a data storage device. Input device(s) 510 may comprise, for example, a keyboard, a keypad, a mouse or other pointing device, a microphone, knob or a switch, an infra-red (IR) port, a docking station, and/or a touch screen. Input device(s) 510 may be used, for example, to enter information into apparatus 500. Output device(s) 520 may comprise, for example, a display (e.g., a display screen) a speaker, and/or a printer.

Data storage device 530 may comprise any appropriate persistent storage device, including combinations of magnetic storage devices (e.g., magnetic tape, hard disk drives and flash memory), optical storage devices, solid state storage devices, Read Only Memory (ROM) devices, etc., while memory 525 may comprise Random Access Memory (RAM), Storage Class Memory (SCM) or any other fast-access memory.

Services 535 and application 540 may comprise program code executed by processor 505 to cause apparatus 500 to perform any one or more of the processes described herein (e.g., 200, 300). Embodiments are not limited to execution of these processes by a single apparatus.

Data 545 (either cached or a full database) may be stored in volatile memory such as memory 525. Data storage device 530 may also store data and other program code and instructions for providing additional functionality and/or which are necessary for operation of apparatus 500, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a memory storing processor-executable instructions; and
a processor to execute the processor-executable instructions to cause the system to:
    obtain a plurality of different application program interfaces (APIs), one for each of a plurality of different technology stacks, to be used in a test flow of a product constructed of the plurality of different technology stacks;
    generate a model of a test flow using each of the plurality of different APIs;
    define input and output parameters for each of the plurality of different APIs in the model;
    automatically generate executable instructions to perform the modeled test flow including the plurality of different APIs in a single execution;
    store a record of the executable instructions to perform modeled test flow;
    execute the record of the executable instructions to perform the modeled test flow;
    analyze a result of the executed modeled test flow; and
    present a report of the result.

2. The system of claim 1, wherein the processor is further enabled to execute the processor-executable instructions to cause the system to receive an indication of each of the plurality of APIs from a user.

3. The system of claim 1, wherein the processor is further enabled to execute the processor-executable instructions to cause the system to generate, in response to a recognition that at least one of the plurality of different APIs to be used in the test flow is missing, the at least one missing API.

4. The system of claim 1, wherein the processor is further enabled to execute the processor-executable instructions to cause the system to receive, from a user via a user interface with the system, an indication of a configuration of the model of the test flow.

5. The system of claim 4, wherein the user interface presents a representation of the plurality of different APIs in the user interface and the user manipulates the representation of the plurality of different APIs within the user interface to provide the indication of the configuration of the model of the test flow.

6. The system of claim 1, wherein the automatically generating of the executable instructions to perform the modeled test flow comprises:
    compiling, based on the defined input and output parameters for each of the different APIs, the model that includes each of the plurality of different APIs in the test flow.

7. A computer-implemented method, the method comprising:
    obtaining, by a processor, a plurality of different application program interfaces (APIs), one for each of a plurality of different technology stacks, to be used in a test flow of a product constructed of the plurality of different technology stacks;
    generating, by the processor, a model of a test flow using each of the plurality of different APIs;
    defining, by the processor, input and output parameters for each of the plurality of different APIs in the model;
    automatically generating, by the processor, executable instructions to perform the modeled test flow including the plurality of different APIs in a single execution;
    storing a record of the executable instructions to perform modeled test flow;
    executing the record of the executable instructions to perform the modeled test flow;
    analyzing a result of the executed modeled test flow; and
    presenting a report of the result.

8. The method of claim 7, further comprising receiving an indication of each of the plurality of APIs from a user.

9. The method of claim 7, further comprising generating, by the processor in response to a recognition that at least one of the plurality of different APIs to be used in the test flow is missing, the at least one missing API.

10. The method of claim 7, further comprising receiving, from a user via a user interface with the system, an indication of a configuration of the model of the test flow.

11. The method of claim 10, wherein the user interface presents a representation of the plurality of different APIs in the user interface and the user manipulates the representation of the plurality of different APIs within the user interface to provide the indication of the configuration of the model of the test flow.

12. The method of claim 7, further comprising compiling, based on the defined input and output parameters for each of the different APIs, the model that includes each of the plurality of different APIs in the test flow.

13. A non-transitory computer-readable medium storing program instructions executable by a processor of a computing system, the medium comprising:
    instructions to obtain a plurality of different application program interfaces (APIs), one for each of a plurality of different technology stacks, to be used in a test flow of a product constructed of the plurality of different technology stacks;
    instructions to generate a model of a test flow using each of the plurality of different APIs;
    instructions to define input and output parameters for each of the plurality of different APIs in the model;
    instructions to automatically generate executable instructions to perform the modeled test flow including the plurality of different APIs in a single execution;
    instructions to store a record of the executable instructions to perform modeled test flow;

instructions to execute the record of the executable instructions to perform the modeled test flow;
instructions to analyze a result of the executed modeled test flow; and
instructions to present a report of the result.

14. The medium of claim 13, further comprising instructions to generate, in response to a recognition that at least one of the plurality of different APIs to be used in the test flow is missing, the at least one missing API.

15. The medium of claim 13, further comprising instructions to receive, from a user via a user interface with the system, an indication of a configuration of the model of the test flow.

16. The medium of claim 15, wherein the user interface presents a representation of the plurality of different APIs in the user interface and the user manipulates the representation of the plurality of different APIs within the user interface to provide the indication of the configuration of the model of the test flow.

* * * * *